United States Patent [19]

Biegen

[11] Patent Number: 4,732,483

[45] Date of Patent: Mar. 22, 1988

[54] INTERFEROMETRIC SURFACE PROFILER

[75] Inventor: James F. Biegen, Middletown, Conn.

[73] Assignee: Zygo Corporation, Middlefield, Conn.

[21] Appl. No.: 27,643

[22] Filed: Mar. 19, 1987

[51] Int. Cl.$^4$ .............................................. G01B 9/02
[52] U.S. Cl. ..................................... 356/351; 356/359
[58] Field of Search ................ 356/351, 357, 359, 360

[56] References Cited

U.S. PATENT DOCUMENTS

| | | | |
|---|---|---|---|
| 4,072,423 | 2/1978 | Kimura et al. | 356/371 X |
| 4,201,473 | 5/1980 | Domenicali et al. | 356/360 |
| 4,594,003 | 6/1986 | Sommargren | 356/349 |
| 4,632,556 | 12/1986 | Akatsu | 356/351 |
| 4,639,139 | 1/1987 | Wyant et al. | 356/360 X |

Primary Examiner—Davis L. Willis
Assistant Examiner—Matthew W. Koren
Attorney, Agent, or Firm—Stiefel, Gross & Kurland

[57] ABSTRACT

An interferometric profiler capable of accurately measuring the topography of a surface under test (48) employs a laser source (10), with the surface under test (48) ultimately being imaged onto the photosensitive elements (58) of a solid state array camera (56) by an objective lens (34). In accomplishing this, the input beam (12) is transformed by a lens (14) into a spherically converging wavefront (16) which is focused onto a rotating diffuser disk (18) to significantly reduce the spatial coherence of the resultant spherically diverging wavefront (22) which is transformed by a lens (26) into a spherically converging wavefront (28) which is totally reflected by a polarizing beamsplitter (30) to produce a diverging wavefront (32). This wavefront (32) is transformed into a collimated wavefront (36) by the lens (34) and enters a quarter-wave phase retardation plate (38) which has an antireflection coating on this surface (40) with the other surface (42) being a flat reference surface. Objective lens (34) transforms the resulting wavefronts (52R) and (52M) into spherical wavefronts (53R) and (52M) which are transmitted as wavefronts (54R) and (54M) by beamsplitter (30) and fall onto the elements (58) of the imaging device (56).

26 Claims, 2 Drawing Figures

INTERFEROMETRIC SURFACE PROFILER

BACKGROUND OF THE INVENTION

1. Field of the Invention

The present invention relates to apparatus for the noncontact measurement of the profile of a surface. More particularly, the invention relates to optical apparatus which is useful for the high accuracy measurement of surface roughness or of the height of a step change in thickness of an opaque film on a substrate.

2. The Prior Art

Prior art techniques available for measuring the profile of a surface include mechanical and optical profilers. A commonly used contacting apparatus used to measure surface profiles and step heights is a stylus instrument, e.g., the Talysurf or the Talystep. However, in the case of a soft or delicate surface, the stylus digs into the surface and measurement results do not truly represent the surface. Other limitations of the stylus technique include its high sensitivity to microphonics and vibrations, the delicate nature of the stylus and the mechanism, and the need for a highly skilled operator to align and use it.

There are numerous optical techniques available for measuring the profile of a surface. For a review and comparison of some of the more common techniques, see J. M. Bennett, "Comparison of Techniques for Measuring the Roughness of Optical Surfaces," *Optical Engineering*, Vol. 24, No. 3, pp. 380–387, 1985.

Prior art optical profilers have been based on a variety of techniques, e.g., scanning fringes of equal chromatic order (FECO) interferometry, see for example, J. M. Bennett, "Measurement of the RMS Roughness, Autocovariance Function and Other Statistical Properties of Optical Surfaces using a FECO Scanning Interferometer," *Applied Optics*, Vol. 15, pp. 2705–2721 (1976); scanning Fizeau interferometry, see for example, J. M. Eastman and P. W. Baumeister, "Measurement of the Microtopography of Optical Surfaces using a Scanning Fizeau Interferometer," *J. Opt. Soc. Am.*, Vol. 64, p. 1369 (A) (1974); optical heterodyne interferometry, see for example, G. E. Sommargren, "Optical Heterodyne Profilometry," *Applied Optics*, Vol. 20, pp. 610–618, (1981); a Mirau interferometer, see for example, B. Bhushan, J. C. Wyant, and C. L. Koliopoulis, "Measurement of Surface Topography of Magnetic Tapes by Mirau Interferometry," *Applied Optics*, Vol. 24, pp. 1489–1497 (1985); a Nomarski-based instrument, see for example, S. N. Jabr, "Surface-roughness measurement by digital processing of Nomarski phase contrast images," *Optics Letters*, Vol. 10 pp. 526–528, (1985); a birefringent microscope, see for example, M. J. Downs, U.S. Pat. No. 4,534,649 issued Aug. 13, 1985; and shearing interference microscopy, see for example, M. Adachi and K. Yasaka, "Roughness measurement using a shearing interference microscope," *Applied Optics*, Vol. 25, pp. 764–768 (1986).

FECO interferometry requires that the surface under test be brought very close to the reference surface, e.g., typically within about several micrometers, thereby frequently causing the surface under test to be damaged by residual dust particles.

The optical heterodyne interferometer which is both common path and does not require a reference surface produces very accurate and precise measurements. While this technique provides state-of-the art optical measurements, it suffers from a number of limitations. In particular, the apparatus is complex and expensive. In addition, since the technique only scans in a circle of fixed radius, it does not profile an area of the surface under test.

The Mirau interferometer suffers from several serious limitations. First, since a beamsplitter and reference mirror must be placed between the objective lens and the surface under test, the resolving power, i.e., numerical aperture (NA), of this objecive lens is severely limited to about 0.60 NA, and the working distance of the objective lens is also reduced significantly. It is desirable to use the highest numerical aperture objective lenses in order to achieve the finest lateral resolution. Second, due to the presence of these optics between the objective lens and the surface under test, an extended light source is required. With a conventional light source, the coherence length is thusly limited to 3–6 micrometers. This short coherence length leads not only to a very tight angular alignment tolerance for the surface under test to obtain interference fringes, but also limits the heights of the steps which can be measured. In addition, the reference surface is in focus, thusly, adversely affecting the measurements.

The birefringent microscope technique is both common path and does not require a reference surface. However, it does have some severe limitations. First, it only scans a line so that it does not profile an area of the surface under test. Second, it is limited in its ability to use a sufficiently large diameter for the reference beam on the surface under test, thereby limiting the extent to which lower spatial frequencies can be measured.

In the present invention, high precision profile measurements can be made with the full range of objective lenses, i.e., from the lowest through the highest numerical aperture, with a large angular alignment tolerance, and with a large working distance over a line or an area of the surface under test. The improvements of the present invention, thusly, overcome the disadvantages of the prior art and allow the high accuracy, fine lateral resolution measurement of surface microroughness and step heights.

SUMMARY OF THE INVENTION

In accordance with the instant invention, I provide an interferometric profiler capable of measuring accurately the topography of a surface under test comprising a source of a beam of linearly polarized, coherent energy, most preferably a laser; means which significantly reduces the spatial coherence of the beam; means, most preferably a lens, a polarizing beamsplitter, and an objective lens, for producing a linearly polarized, collimated second beam which has significantly reduced spatial coherence; means, most preferably a quarter-wave phase retardation plate with a first surface which has an anti-reflection coating and with a second surface which is closest to the surface under test and which is a flat reference surface and splits the second beam into a linearly polarized, reflected reference wavefront and a circularly polarized, transmitted wavefront; means, most preferably a piezoelectric transducer, for varying the spacing between the reference surface and the surface under test; means for recombining the reference wavefront and t he measurement wavefront after it interacts with the surface under test; means for imaging the surface under test onto the photosensitive elements of an imaging device, which device is most preferably a solid-state array camera, for photosensing and viewing either the alignment spots or the interference pattern produced from the recombined reference and measurement wavefronts; means, most preferably a variable aperture iris, for bringing a very smooth surface under test into focus onto the photosensitive elements of the imaging device; means for processing the output of the imaging device to provide a profile of the surface under test; and means for focusing the reference wavefront and the measurement wavefront after it interacts with the surface under test as spots to achieve angular alignment of the surface under test and the reference surface.

THE DRAWINGS

FIG. 1 depicts in schematic form an embodiment of the apparatus of the present invention in the form of an optical measuring system, by way of example; and FIG. 2 depicts a schematic block diagram of the electronic processor circuitry portion of the embodiment of FIG. 1.

DETAILED DESCRIPTION OF THE INVENTION

Figure 1:
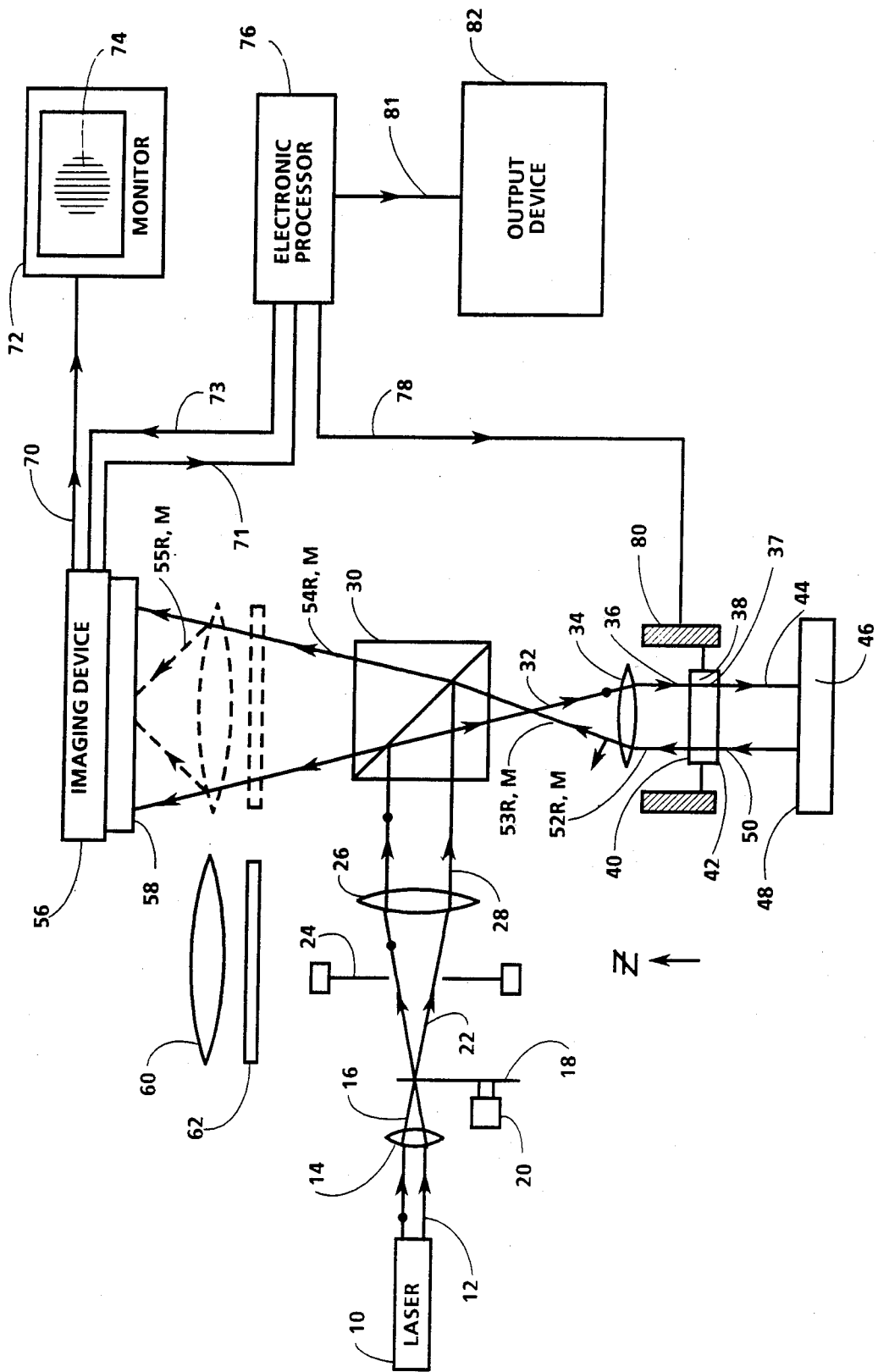

FIG. 1 depicts in schematic form an embodiment of the instant invention for providing noncontact measurement of the profile of a surface. While the apparatus of the present invention has application for a wide range of radiation sources, the following description is taken by way of example, with respect to an optical measuring system, such as one preferably employing a laser (10). Light source (10), which most preferably is a laser, emits a nearly collimated beam (12) which is linearly polarized perpendicular to the plane of FIG. 1 as indicated by the dot. Lens (14) transforms beam (12) into a spherically converging wavefront (16) which is focused onto a diffuser disk (18) to produce wavefront (22) which is scattered from the diffuser disk (18). Diffuser disk (18) is rotated by a motor (20) to significantly reduce the spatial coherence of the spherically diverging wavefront (22). Lens (26) transforms wavefront (22) into a spherically converging wavefront (28) which is totally reflected by polarizing beamsplitter (30) to produce a diverging wavefront (32). Objective lens (34) transforms wavefront (32) into a collimated wavefront (36) which then enters a quarter-wave phase retardation plate (38) via its first surface (40) to become wavefront (37). Surface (40) has an anti-reflection coating on it so that essentially all of wavefront (32) is transmitted by surface (40). When wavefront (37) impinges upon the second surface (42) of the quarter-wave phase retardation plate (38), it is circularly polarized. Second surface (42) is a flat reference surface. At second surface (42), part, about 4%, of wavefront (37) is reflected to emerge as wavefront (52R) and part is transmitted to emerge as wavefront (44). Wavefront (52R) is linearly polarized in the plane of FIG. 1 as indicated by the arrow. Wavefront (44) is circularly polarized. Wavefront (44) impinges onto the surface under test (48) of the part (46) under test to produce wavefront (50) which has a circular polarization opposite to that of wavefront (44). Wavefront (50) is transmitted by quarter-wave phase retardation plate (38) to produce a wavefront (52M) which is linearly polarized in the plane of FIG. 1 as indicated by the arrow. Objective lens (34) transforms wavefronts (52R) and (52M) into spherical wavefronts (53R) and (53M) which are totally transmitted by polarizing beamsplitter (30) as wavefronts (54R) and (54M). Wavefronts (54R) and (54M) then fall onto the photosensitive elements (58), or pixels, of an imaging device (56), which can be a solid state camera with either a CCD, CID, MOS, or photodiode array. The surface under test (48) is imaged onto the photosensitive elements (58), or pixels, by objective lens (34). Imaging device (56) may be a linear array with either the interference pattern or the array scanned in a direction orthogonal to the length of the array for some applications. The standard RS170 video output (70) of the imaging device (56) is fed into a CCTV monitor (72) to provide an image (74) of the interference pattern produced by wavefronts (54R) and (54M).

Lens (60) and neutral density filter (62) can be inserted into wavefronts (54R) and (54M), as represented by the dashed elements in FIG. 1, to produce alignment spots on the CCTV monitor (72). Superposition of the spots by adjustment of the angular orientation of the surface under test (48) will assure the presence of interference fringes when elements (60) and (62) are removed from wavefronts (54R) and (54M). The details for conventionally aligning an interferometer are disclosed in Domenicalli and Hunter, U.S. Pat. No. 4,201,473, issued May 6, 1980.

The purpose of rotating the diffuser disk (18) is to significantly reduce the spatial coherence of wavefront (22) which, in turn, decreases the lateral extent to which spurious fringes caused by dust, scratches, digs, and other imperfections can exist across the wavefronts in the system. This results in a significant reduction in the overall noise level in the measurements.

The purpose of the variable diameter iris (24) is to aid in the focusing on surfaces under test which have very low microroughness. The variable diameter iris (24) is preferably positioned in a plane which is conjugate to the surface under test (48) so that it will be in focus not only at the surface under test (48) but also at the photosensitive elements (58). A surface under test with structural detail is first brought to focus on the photosensitive elements (58) and the variable diameter iris (24) is adjusted so that the edge of the variable diameter iris (24) is clearly in focus on the photosensitive elements (58). Then, when a surface under test with very low microroughness is inserted, its position is adjusted until the edge of the variable diameter iris (24) is again in clear focus on the photosensitive elements (58).

Quarter-wave phase retardation plate (38) is attached to piezoelectric transducer (80) which varies the spacing between the reference surface (42) and the surface under test (48) by producing motion in the Z direction under the control of an electrical signal (78). The thickness of quarter-wave phase retardation plate (38) is preferably chosen so that its optical thickness is close to that of a 0.17 mm thick glass cover plate for which the objective lens (34) has been corrected. Surface (40) is close to the last surface of objective lens (34) to maximize the working distance, i.e. the distance between surfaces (42) and (48).

Since reference surface (42) is not in focus on photosensitive elements (58), its own microroughness does not adversely affect the measurement of the microroughness of the surface under test (48).

An important advantage of the quarter-wave phase retardation plate (38) of the optical system of the instant invention is that it isolates the imaging device from any back reflections produced by any surfaces on which the input wavefronts, e.g. (28) and (32), impinge. These back reflections would cause internal spurious fringe patterns which would appear as noise and errors in the measurements. In addition, the laser (10) is isolated from any reflections which could cause the laser (10) to become unstable.

For a surface under test (48) with high reflectivity, the second surface (42) of quarter-wave phase retardation plate (38) can have a specially designed absorbing coating applied so that the intensities of interfering wavefronts (54R) and (54M) are matched; see, for example, Hunter and Forman, U.S. Pat. No. 3,998,553 issued Dec. 21, 1976.

The output (71) provides the photosignals from the array of pixels of imaging device (56) to the electronic processor (76). Electronic signals (73) are provided by the electronic processor (76) to control the imaging device (56) if needed. The electronic output (78) from electronic processor (76) is fed into the piezoelectric transducer (80) to modulate the interference between wavefronts (54R) and (54M) by varying the spacing between surfaces (42) and (48). The electronic output (78) from electronic processor (76) is fed into output device (82), e.g. a CRT, printer, or a plotter, to view or record the topography of the surface under test (48).

Figure 2:
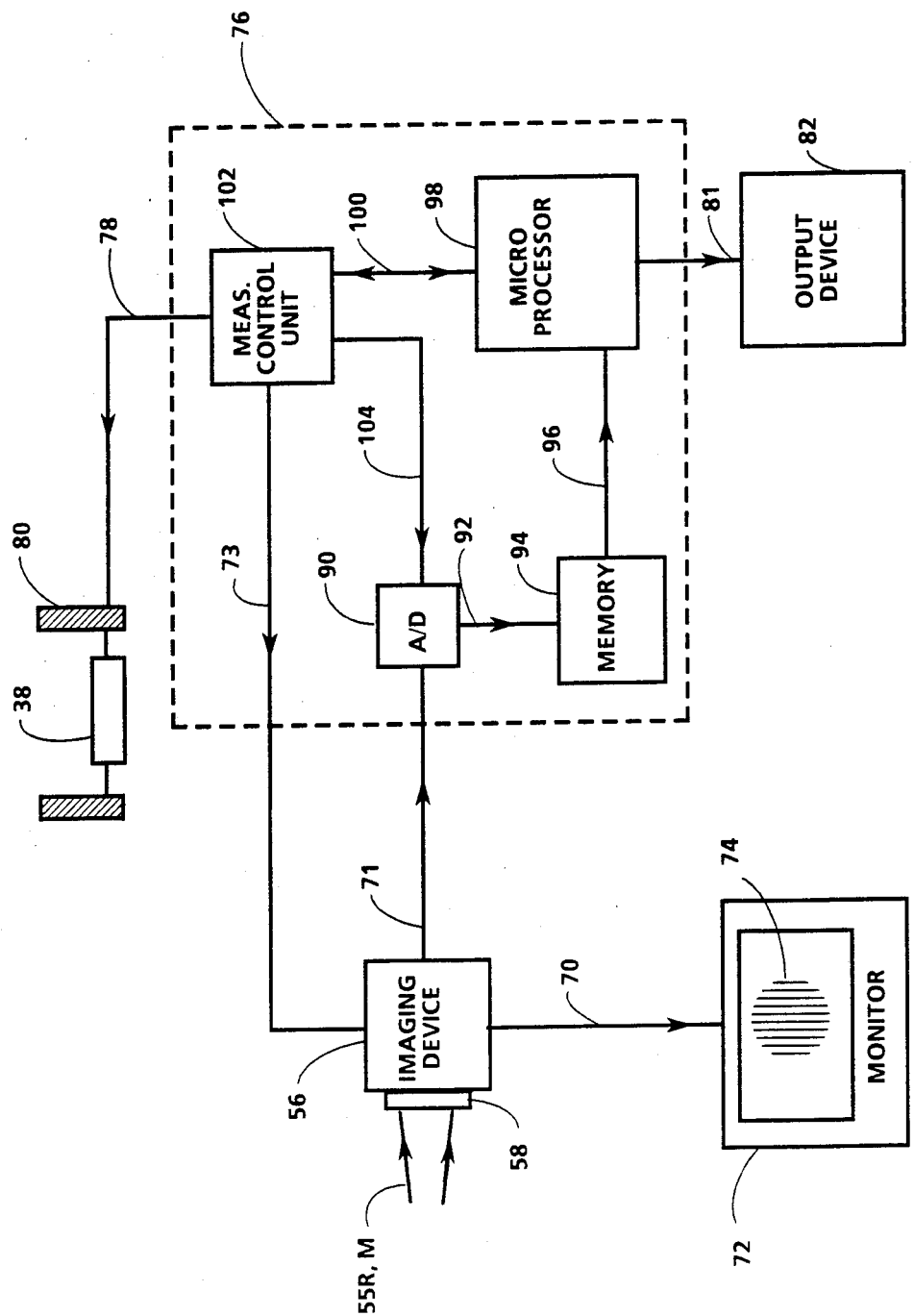

Referring now to FIG. 2, FIG. 2 depicts a schematic block diagram of the electronic processor circuitry (76) used in the embodiment of FIG. 1. In FIG. 2, the interference of wavefronts (55R) and (55M) forms an interference pattern on photosensitive elements (58) of the imaging device (56). Output (71) of the imaging device (56) is preferably fed into an analog-to-digital converter (90) to provide a digital signal (92) which is stored in memory (94). A microprocessor (98) is provided in electronic processor (76) which not only manipulates the data stored in memory (94), received via digital signal (96), but also provides and receives signals (100) with the measurement control unit (102) and provides an output signal (81) to the output device (82) which may be a printer, CRT, or plotter, for example. The measurement control unit (102) provides the electronic output signal (78) to the piezoelectric transducer (80); a clock signal (73) to the imaging device (56); and a synchronization signal (104) to the A/D converter (90).

A phase map of the interference pattern can be conventionally produced with the method described by M. Schaham, *Proceedings SPIE,* vol. 306, pp. 183–191(1981). However, the present invention is not limited to this method and can be used with a variety of phase map methods, e.g. see Gallagher, et al., U.S. Pat. No. 3,694,088 issued Sept. 26, 1972.

The principal advantages of the instant invention are that it can use a broad range of objective lenses from very low magnification to the highest magnification and largest numerical aperture, NA, e.g. 100X, 0.95 NA, to provide very fine lateral resolution; the coherence length is always greater than the depth of focus for all objective lenses so that large step heights can be measured; the reference surface is out of focus so that its own microroughness does not enter critically in the measurements; and the alignment tolerance to obtain interference fringes for the surface under test is eased by an order of magnitude compared to an equal path white light interferometer due to the long coherence length.

While a preferred embodiment of the invention has been disclosed, obviously modification can be made therein, without departing from the scope of the invention as defined in the following claims.

What is claimed is:

1. An interferometric profiler capable of measuring the topography of a surface under test comprising a source of a first spatially coherent linearly polarized input beam; means optically aligned with said input beam for significantly reducing the spatial coherence of said input beam; means optically aligned with said coherence reduced input beam for producing a linearly polarized collimated second beam which has significantly reduced spatial coherence; means optically aligned with said surface under test and said second beam for splitting said second beam into a linearly polarized, reflected reference wavefront and a circularly polarized, transmitted measurement wavefront; said second beam splitting means including a flat reference surface spaced from said surface under test; means for varying the spacing between said reference surface and said surface under test; means optically aligned with said reference surface and said surface under test for recombining said reference wavefront and said measurement wavefront after it interacts with said surface under test; an imaging device optically aligned with said surface under test for photosensing and viewing either alignment spots or an interference pattern produced from said recombined reference and measurement wavefronts; means for imaging said surface under test onto said photosensitive elements; said imaging means comprising means for bringing a very smooth surface under test into focus onto said photosensitive elements; and means operatively connected to said imaging means for processing the output of said imaging device for providing a profile of said surface under test.

2. An interferometric profiler in accordance with claim 1 further comprising means for focusing said reference wavefront and said measurement wavefront after it interacts with said surface under test as spots for achieving angular alignment of said surface under test and said reference surface.

3. An interferometric profiler in accordance with claim 2 wherein said input beam source is a laser.

4. An interferometric profiler in accordance with claim 2 wherein said means for significantly reducing said input beam spatial coherence comprises lens means for transforming said input beam into a spherically converging wavefront, a diffuser disk, said lens focusing said spherically converging wavefront on to said disk for producing a wavefront which is scattered from said disk, and means for rotating said disk for significantly reducing the spatial coherence of said spherically diverging wavefront.

5. An interferometric profiler in accordance with claim 4 wherein said second beam producing means comprises a lens for transforming said spherically diverging wavefront into a spherically converging wavefront, a polarizing beamsplitter for totally reflecting said spherically converging wavefront for producing a diverging wavefront and an objective lens for transforming said diverging wavefront into said collimated wavefront.

6. An interferometric profiler in accordance with claim 5 wherein said second beam splitting means comprises a quarter-wave retardation plate having a first surface having an antireflection coating and a second surface which is closest to said surface under test, said second surface comprising said flat reference surface.

7. An interferometric profiler in accordance with claim 6 wherein said surface spacing varying means comprises a piezoelectric transducer.

8. An interferometric profiler in accordance with claim 7 wherein said imaging device comprises a solid-state array camera.

9. An interferometric profiler in accordance with claim 8 wherein said means for bringing said very smooth surface under test into focus onto said photosensitive elements comprises a variable aperture iris.

10. An interferometric profiler in accordance with claim 1 wherein said input beam source is a laser.

11. An interferometric profiler in accordance with claim 10 wherein said means for significantly reducing said input beam spatial coherence comprises lens means for transforming said input beam into a spherically converging wavefront, a diffuser disk, said lens focusing said spherically converging wavefront on to said disk for producing a wavefront which is scattered from said disk, and means for rotating said disk for significantly reducing the spatial coherence of said spherically diverging wavefront.

12. An interferometric profiler in accordance with claim 11 wherein said second beam producing means comprises a lens for transforming said spherically diverging wavefront into a spherically converging wavefront, a polarizing beamsplitter for totally reflecting said spherically converging wavefront for producing a diverging wavefront and an objective lens for transforming said diverging wavefront into said collimated wavefront.

13. An interferometric profiler in accordance with claim 12 wherein said second beam splitting means comprises a quarterwave retardation plate having a first surface having an antireflection coating and a second surface which is closest to said surface under test, said second surface comprising said flat reference surface.

14. An interferometric profiler in accordance with claim 13 wherein said surface spacing varying means comprises a piezoelectric transducer.

15. An interferometric profiler in accordance with claim 14 wherein said imaging device comprises a solid-state array camera.

16. An interferometric profiler in accordance with claim 15 wherein said means for bringing said very smooth surface under test into focus onto said photosensitive elements comprises a variable aperture iris.

17. An interferometric profiler in accordance with claim 1 wherein said imaging device comprises a solid-state array camera.

18. An interferometric profiler in accordance with claim 17 wherein said means for bringing said very smooth surface under test into focus onto said photosensitive elements comprises a variable aperture iris.

19. An interferometric profiler in accordance with claim 1 wherein said means for bringing said very smooth surface under test into focus onto said photosensitive elements comprises a variable aperture iris.

20. An interferometric profiler in accordance with claim 19 wherein said input beam source is a laser.

21. An interferometric profiler in accordance with claim 20 wherein said imaging device comprises a solid-state array camera.

22. An interferometric profiler in accordance with claim 21 further comprising means for focusing said reference wavefront and said measurement wavefront after it interacts with said surface under test as spots for achieving angular alignment of said surface under test and said reference surface.

23. An interferometric profiler in accordance with claim 1 wherein said means for significantly reducing said input beam spatial coherence comprises lens means for transforming said input beam into a spherically converging wavefront, a diffuser disk, said lens focusing said spherically converging wavefront on to said disk for producing a wavefront which is scattered from said disk, and means for rotating said disk for significantly reducing the spatial coherence of said spherically diverging wavefront.

24. An interferometric profiler in accordance with claim 23 wherein said second beam producing means comprises a lens for transforming said spherically diverging wavefront into a spherically converging wavefront, a polarizing beamsplitter for totally reflecting said spherically converging wavefront for producing a diverging wavefront and an objective lens for transforming said diverging wavefront into said collimated wavefront.

25. An interferometric profiler in accordance with claim 24 wherein said second beam splitting means comprises a quarter-wave retardation plate having a first surface having an antireflection coating and a second surface which is closest to said surface under test, said second surface comprising said flat reference surface.

26. An interferometric profiler in accordance with claim 1 wherein said surface spacing varying means comprises a piezoelectric transducer.

* * * * *